(12) United States Patent
Walch et al.

(10) Patent No.: US 6,308,504 B1
(45) Date of Patent: Oct. 30, 2001

(54) DEVICE FOR TREATING CUT FODDER AND MOWER EMPLOYING SUCH A TREATMENT DEVICE

(75) Inventors: Martin Walch, Dettwiller; Bernard Wattron, Haegen, both of (FR)

(73) Assignee: Kuhn S.A., Saverne (FR)

( * ) Notice: Subject to any disclaimer, the term of this patent is extended or adjusted under 35 U.S.C. 154(b) by 0 days.

(21) Appl. No.: 09/521,239

(22) Filed: Apr. 5, 2000

(30) Foreign Application Priority Data

Apr. 16, 1999 (FR) .................................................. 99 04927

(51) Int. Cl.[7] .......................... A01D 35/264; A01D 34/66
(52) U.S. Cl. .......................................... 56/16.4 R; 56/11.6
(58) Field of Search ............................ 56/1, 6, 14.9, 15.6, 56/15.9, 12.7, 16.2, 16.4 R, 192, 11.6, 227, 17.3, 218

(56) References Cited

U.S. PATENT DOCUMENTS

| | | |
|---|---|---|
| 4,189,902 | 2/1980 | Kaetzel . |
| 4,610,128 | 9/1986 | Ermacora . |
| 4,669,256 | 6/1987 | Ermacora et al. . |
| 4,694,640 | 9/1987 | Ermacora et al. . |
| 4,714,123 | 12/1987 | Ermacora et al. . |
| 4,719,742 | 1/1988 | Ermacora et al. . |
| 4,720,964 | 1/1988 | Ermacora et al. . |
| 4,723,396 | 2/1988 | Ermacora . |
| 4,763,463 | 8/1988 | Ermacora et al. . |
| 4,771,591 | 9/1988 | Ermacora et al. . |
| 4,811,553 | 3/1989 | Ermacora et al. . |
| 4,833,868 | 5/1989 | Ermacora et al. . |
| 4,848,069 | 7/1989 | Ermacora et al. . |
| 4,947,629 | 8/1990 | Ermacora et al. . |
| 4,986,064 | 1/1991 | Ermacora . |
| 4,991,383 | 2/1991 | Ermacora . |
| 5,060,462 | 10/1991 | Helfer et al. . |
| 5,094,063 | 3/1992 | Wattron et al. . |
| 5,107,663 | 4/1992 | Wattron et al. . |
| 5,136,828 | 8/1992 | Ermacora . |
| 5,199,249 | 4/1993 | Wattron et al. . |
| 5,199,250 | 4/1993 | Ermacora et al. . |
| 5,357,737 | 10/1994 | Ermacora et al. . |
| 5,417,042 | 5/1995 | Walch et al. . |
| 5,423,165 | 6/1995 | Walch et al. . |
| 5,507,136 | 4/1996 | Walch . |
| 5,522,208 | 6/1996 | Wattron . |
| 5,660,032 | 8/1997 | Neuerburg et al. . |
| 5,722,222 | 3/1998 | Walters et al. . |
| 5,749,390 | 5/1998 | Ermacora et al. . |
| 5,794,424 | 8/1998 | Ermacora et al. . |
| 5,852,921 | 12/1998 | Neuerburg et al. . |
| 5,857,314 | 1/1999 | Wolff . |
| 5,901,533 | 5/1999 | Ermacora et al. . |
| 5,901,537 | 5/1999 | Walch et al. . |
| 5,966,913 | 10/1999 | Neuerburg . |
| 5,992,133 | 11/1999 | Walch et al. . |
| 6,003,291 | 12/1999 | Ermacora et al. . |

FOREIGN PATENT DOCUMENTS

| | | |
|---|---|---|
| 441 177 | 5/1941 | (BE) . |
| 958 627 | 2/1957 | (DE) . |
| 1 482 759 | 8/1969 | (DE) . |
| 0 343 699 | 11/1989 | (EP) . |

Primary Examiner—Robert E. Pezzuto
(74) Attorney, Agent, or Firm—Oblon, Spivak, McClelland, Maier & Neustadt, P.C.

(57) ABSTRACT

A treatment device for treating cut fodder includes a treatment rotor, first and second supports, and a driving device for driving the treatment rotor. The first support of the treatment device is located near a first end of the treatment rotor. The first support includes a first bearing in which the first end of the treatment rotor is guided in its rotation. The driving device includes a transmission device. The transmission device includes a first and second wheels, at least one endless transmission member, and a regulating or adjusting mechanism for regulating or adjusting the tension in the at least one endless transmission member. The second wheel of the transmission device is mounted on the first end of the treatment rotor. The at least one endless transmission member is wound around both the first and second wheels of the transmission device. The treatment device for treating cut fodder is characterized in that the regulating or adjusting mechanism for adjusting the tension in the endless transmission member includes the first bearing of the first support of the treatment device and the second wheel of the transmission device such that both the first bearing and the second wheel can be moved away from the first wheel of the transmission device in order to arrive at a desired position of adjustment. The regulating or adjusting mechanism also includes a retaining device for retaining the first bearing and the second wheel in the desired position of adjustment. The retaining device includes a tensioning member.

22 Claims, 4 Drawing Sheets

DEVICE FOR TREATING CUT FODDER AND MOWER EMPLOYING SUCH A TREATMENT DEVICE

CROSS-REFERENCE TO RELATED APPLICATIONS

This application is related to and claims priority, under 35 U.S.C. §119, from French Patent Application No. 99 04927, the entire contents of which is hereby incorporated by reference herein.

BACKGROUND OF THE INVENTION

1. Field of the Invention

The present invention generally relates to a treatment device for treating cut fodder and to a mower employing the treatment device.

2. Discussion of the Background

A mower-conditioner includes a treatment device for treating cut fodder. Broadly speaking, the treatment device includes a treatment rotor, which can rotate about an axis of rotation, and a driving device for driving the rotor. Such a treatment device is known and is sold under the manufacturer's designation KUHN FC 300. The driving device includes a drive member and a transmission device. The transmission device includes:

a first wheel mounted on an output shaft of the drive member;

a second wheel mounted on the first end of the treatment rotor;

endless transmission members wound around the first wheel and the second wheel; and a regulating or adjusting mechanism for regulating or adjusting the tension in the endless transmission members.

The regulating or adjusting mechanism, for regulating or adjusting the tension in the endless transmission members, includes an additional wheel against which the transmission members rest. This additional wheel is connected to an arm via a first connection being of a pivot type. The arm is connected to a support structure via a second connection of the pivot type. The arm can be pivoted about the second connection via a screw-nut system so as to allow the tension in the transmission members to be adjusted. In order to keep the additional wheel in the desired position of adjustment, a spring, which acts on the nut of the screw-nut system, is also provided.

Therefore, a conventional regulating or adjusting mechanism of this kind, for regulating or adjusting the tension in transmission member, is relatively expensive and complicated.

SUMMARY OF THE INVENTION

The object of the present invention is to improve and simplify the above-described conventional drive device, while at the same time making sure that the result obtained is economical.

To this end, the treatment device for treating cut fodder of the present invention is one wherein the regulating or adjusting mechanism for regulating or adjusting the tension in the endless transmission member includes a first bearing and a second wheel, both of which can be moved away from the first wheel, and means which allow the first bearing and the second wheel to be kept in the desired position of adjustment.

The present invention also relates to the following features taken in isolation or in any technically feasible combination:

retaining means for retaining the first bearing and the second wheel in the desired position of adjustment by immobilizing the first bearing and the second wheel;

the first support includes a carrier member to which the first bearing is connected via an articulation, the axis of which is approximately parallel to the axis of rotation of the treatment rotor;

the articulation connecting the first bearing to the carrier member is of the elastic type;

the retaining means for retaining the first bearing and the second wheel in the desired position of adjustment include a tensioning member which acts on the first bearing;

the tensioning member acts approximately following a straight line passing through an axis of rotation of the first wheel and an axis of rotation of the second wheel;

the tensioning member is a telescopic strut;

the telescopic strut includes two threads of opposite pitch;

the second bearing is of the spherical-type;

the second support includes a carrier member to which the second bearing is connected via an elastic connection.

The present invention also relates to a mower including at least one cutting mechanism and at least one treatment device for treating the fodder cut by the cutting mechanism, wherein the treatment device exhibits one or more of the above features.

BRIEF DESCRIPTION OF THE DRAWING FIGURES

Other objects, features, and advantages of the present invention will become apparent from the following description with reference to the appended drawings which, by way of non-limiting examples, depict one embodiment of the present invention.

DETAILED DESCRIPTION OF THE PREFERRED EMBODIMENTS

Figure 1:
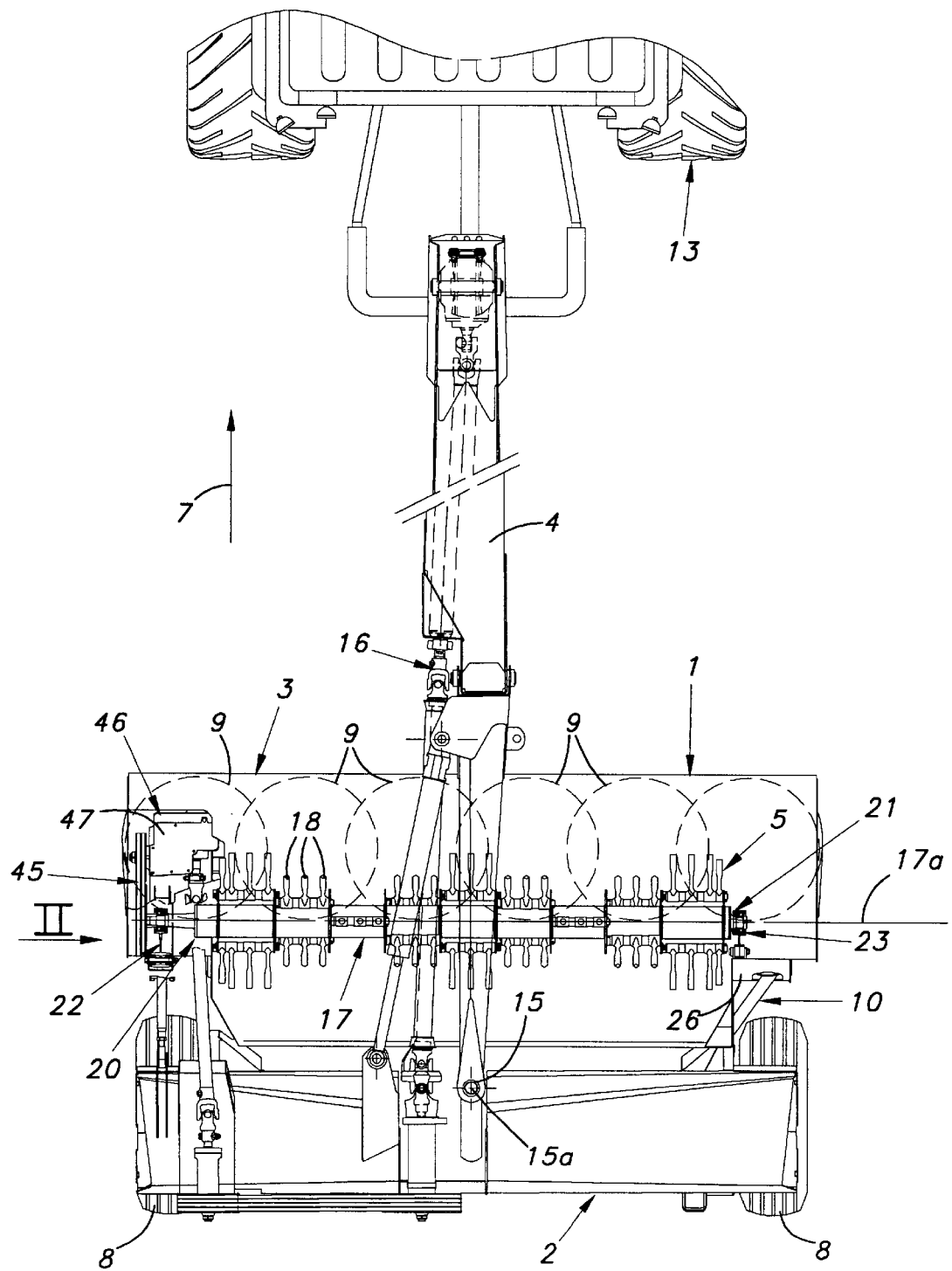
FIG. 1 is a top plan view of a mower which includes a treatment device for treating the cut fodder according to the present invention.

FIGS. 1 to 4 depict a mower 1 according to the embodiment which includes a chassis 2, a cutting mechanism 3, a drawbar 4, and a treatment device 5 for treating the fodder cut by the cutting mechanism 3.

Particularly in the operational position, the chassis 2 extends transversely to the direction of forward travel 7 and, according to the embodiment depicted, has two wheels 8 via which it can be moved along.

In the remainder of the description, the ideas of "front", "rear", "in front of" and "behind" are defined with respect to the direction of forward travel 7 indicated by the forward-travel arrow and the ideas of "right" and "left" are defined when looking at the mower 1 from the rear, in the direction of forward travel 7.

The cutting mechanism 3 includes cutting members 9 (depicted diagrammatically in FIG. 1), which are intended to cut the standing harvest, and is suspended from the chassis 2 in a movable way via a suspension device 10.

The drawbar 4 is, for its part, connected firstly to a tractor vehicle 13 in a way known to those skilled in the art, and secondly to the chassis 2 via a first articulation 15, the geometric axis 15a of which is at least approximately vertical.

A drive mechanism 16 is also provided to allow, firstly, the cutting members 9 of the cutting mechanism 3, and secondly, the treatment device 5 for treating the cut fodder, to be driven from the tractor vehicle 13. For this purpose, the treatment device 5 for treating the cut fodder includes a treatment rotor 17 intended to rotate about an axis of rotation 17a extending, during operation of the treatment device 5, approximately horizontally and transversely to the direction of forward travel 7. According to the embodiment depicted, the axis of rotation 17a is coincident with the longitudinal axis of the treatment rotor 17. The treatment rotor 17 includes a certain number of treatment elements 18 which are connected pivotably to the treatment rotor 17.

The treatment rotor 17 furthermore includes a left-hand lateral end 20 and a right-hand lateral end 21.

Figure 3:
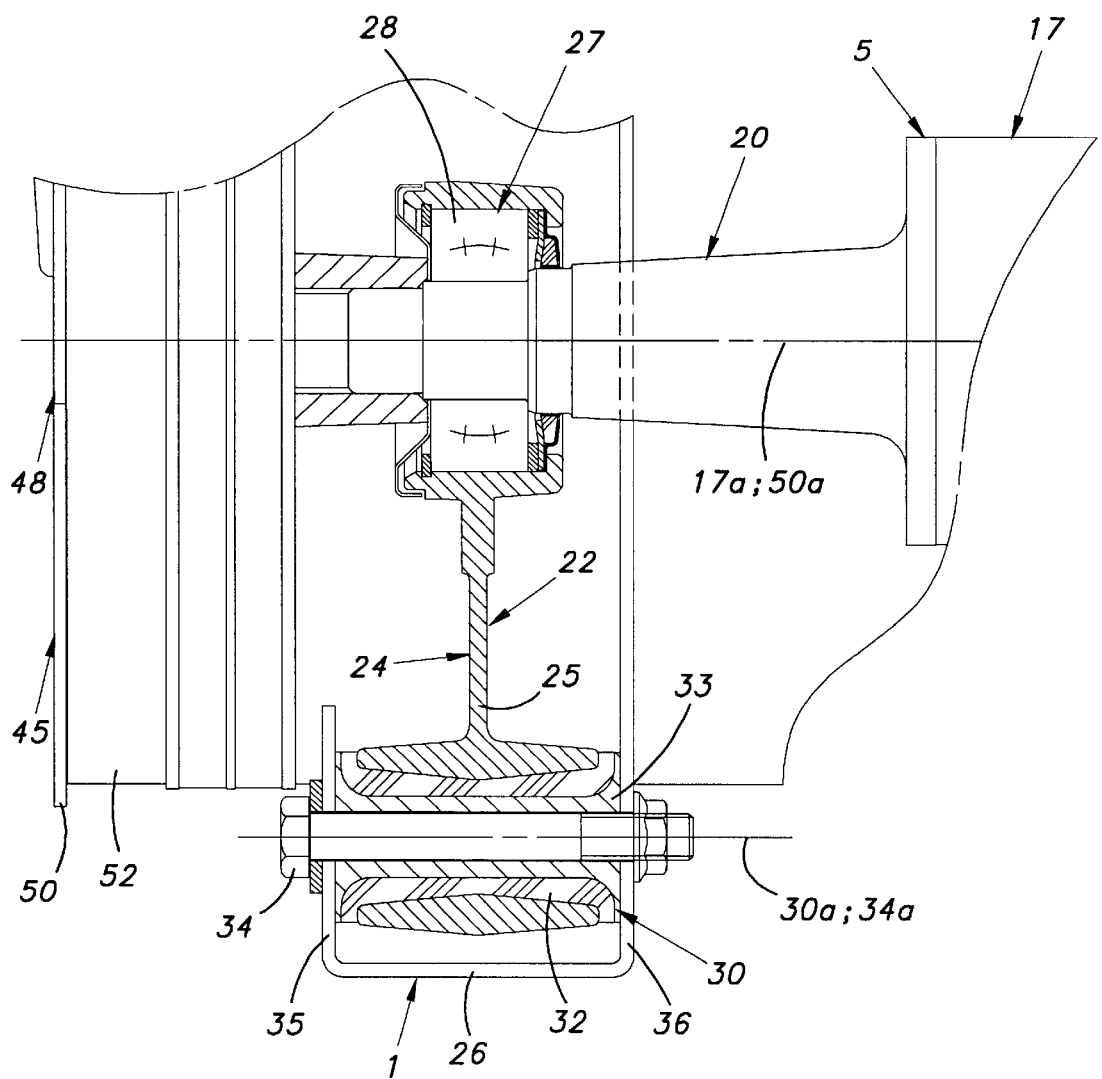
FIG. 3 is a partial cross-sectional view of a first bearing of the mower of FIG. 1.

The treatment device 5 for treating the cut fodder additionally includes a first support 22 for supporting the left-hand lateral end 20 of the treatment rotor 17 and a second support 23 for 5 supporting the right-hand lateral end 21 of the treatment rotor 17. For this purpose, the first support 22 is located near the left-hand lateral end 20 and includes a first bearing 24 in which the left-hand lateral end 20 of the treatment rotor 17 is guided in 10 its rotation. In the light of FIG. 3, it may be seen that the first bearing 24 is made up, according to the embodiment depicted, of a connecting rod 25 connected, on one hand, to a carrier member 26 which forms part of the first support 22 and, on another hand, to the left-hand lateral end of the treatment rotor 17.

The connecting rod 25 is connected to the left-hand lateral end of the treatment rotor 17 via a connection 27 of the pivot type, which, according to the embodiment depicted, is made up of a spherical-type bearing 28 which advantageously allows the treatment rotor 17 to rotate about the three trigonometric axes with respect to the connecting rod 25. The connecting rod 25 is connected to the carrier member 26 via an articulation 30 of the elastic type having an axis 30a approximately parallel to the axis of rotation 17a of the treatment rotor 17. The articulation 30 of the elastic type includes, on one hand, an elastic element 32 which may be made of natural or synthetic elastomer and, on another hand, a ring 33 of cylindrical shape, on the outside of which the elastic element 32 is fixed and through which a screw 34 extends, The longitudinal axis 34a of the screw 34 is at least approximately parallel to the axis of 5 rotation 17a of the treatment rotor 17. The ring 33 is located between two wings 35, 36 of the carrier member 26, thus forming a fork. Such an elastic element 32 advantageously allows the filtering out all or some of the vibration between the treatment rotor 17 and the carrier member 26 and additionally allows a relative movement of the spherical-bearing type of the connecting rod 25 with respect to the carrier member 26, thus making the connecting rod 25 considerably easier to mount on the carrier member 26 and making the connecting rod 25 and the carrier member 26 easier to produce.

Figure 4:
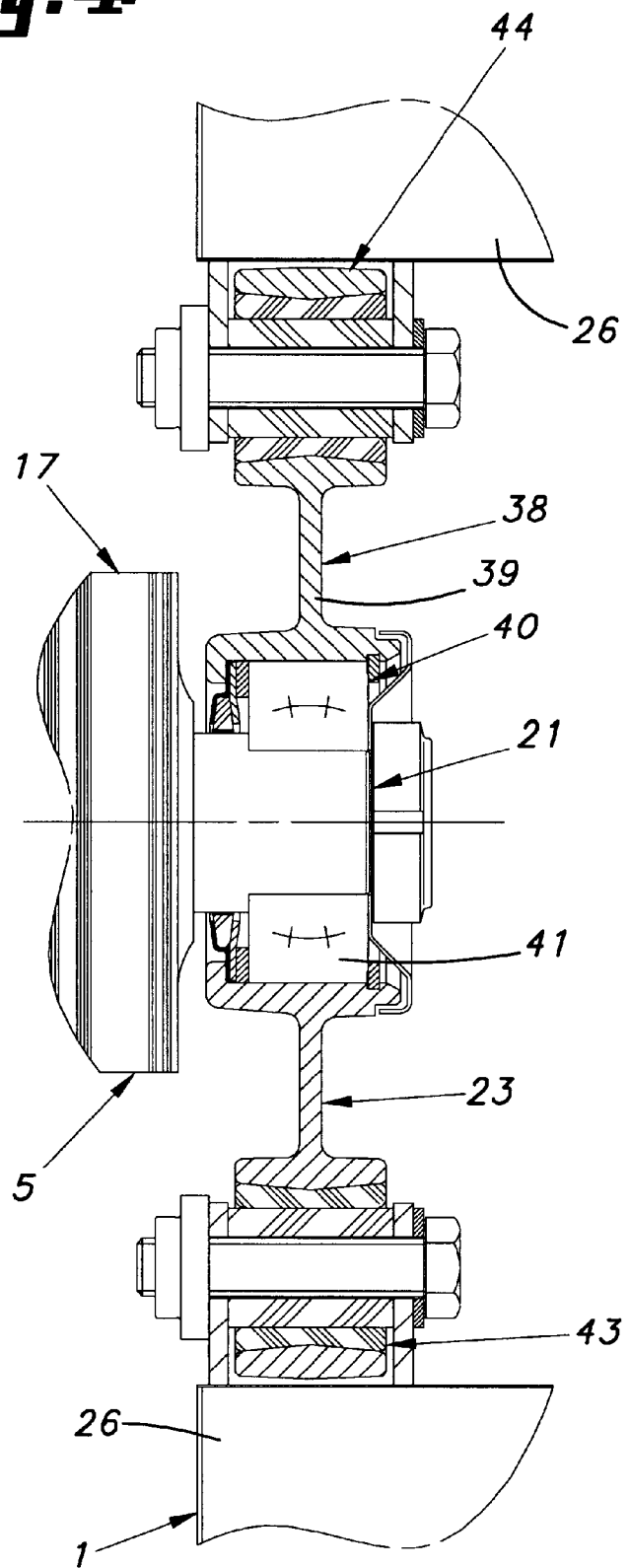
FIG. 4 is a partial cross-sectional view of a second bearing of the mower of FIG. 1.

The second support 2 is, for its part, located near the right-hand lateral end 21 and includes a second bearing 38 in which the right-hand lateral end 21 of the treatment rotor 17 is guided in its rotation. In the light of FIG. 4, it may be seen that the second bearing 38 is, according to the embodiment depicted, made up of double connecting rod 39 connected, on one hand, to the carrier member 26 and, on another hand, to the right-hand lateral end 21 of the treatment rotor 17.

The double connecting rod 39 is connected to the right-hand lateral end 21 of the treatment rotor 17 via another connection 40 of the pivot type. The pivot-type connection 40 is also made up of a spherical-type bearing 41 which advantageously allows the treatment rotor 17 to rotate about the three trigonometric axes with respect to the double connecting rod 39.

The double connecting rod 39 is connected to the carrier member 26 via two additional articulations 43, 44 which are located diametrically opposite to one another with respect to the pivot-type connection 40. Each additional articulation 43, 44 is also of the elastic type and includes elements which are identical to those which make up the previously described articulation 30. Therefore, the two additional articulations 43, 44 also allow all or some of the vibration between the treatment rotor 17 and the carrier member 26 to be filtered out and also allow relative movement 15 of the spherical-bearing type of the double connecting rod 39 with respect to the carrier member 26 so as to make the additional articulations 43, 44 easier to produce and easier to mount on the carrier member 26.

It will be further noted that none of the articulations 30, 43, 44, which include an elastic element, require operator maintenance.

Figure 2:
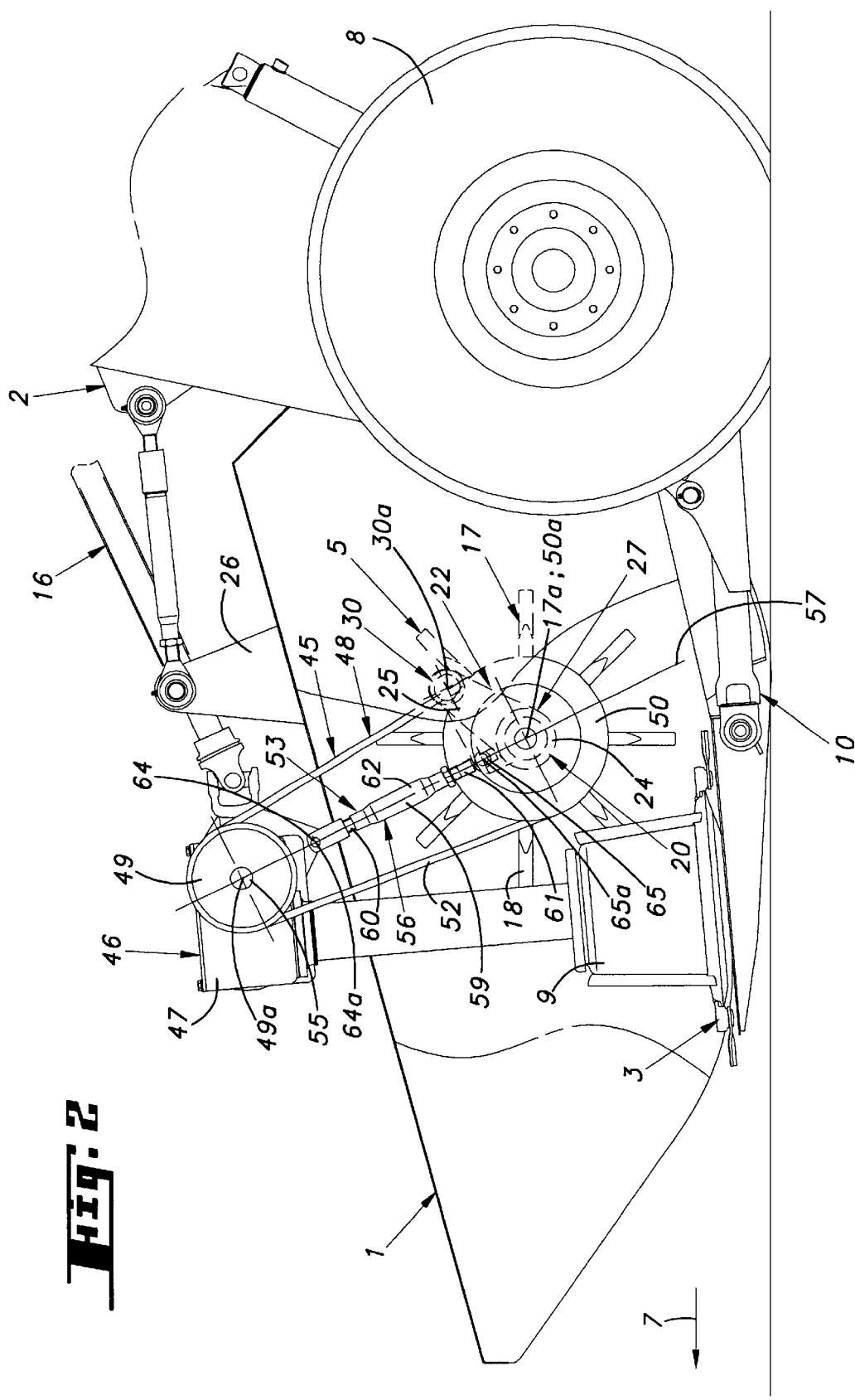
FIG. 2 is a side elevational view of the mower in the direction of arrow II shown in FIG. 1.

In the light of FIG. 2, it may also be seen that the treatment device 5 for treating cut fodder includes a drive device 45 intended to drive the rotation of the treatment rotor 17 for treating the cut fodder. For this purpose, the drive device 45 includes a drive member 46 which, according to the embodiment depicted, is made up of a box 47 driven by the mechanism 16 which drives the mower 1.

The drive device 45 further includes a transmission device 48 itself containing a first wheel 49, a second wheel 50, a endless transmission member which, according to the embodiment depicted, is a belt 52, and a regulating or adjusting mechanism 53 for regulating or adjusting the tension in the endless transmission member. The first wheel 49 is mounted on an output shaft 55 of the box 47, while the second wheel 50 is mounted on the left-hand lateral end 20 of the treatment rotor 17. The belt 52 is wound over the first wheel 49 and over the second wheel 50. From FIG. 2 it may be seen that the regulating or adjusting mechanism 53 for regulating or adjusting the tension in the belt 52 includes the first bearing 24 and the second wheel 50 and in addition, allows the second wheel 50 to be moved away from the first wheel 49. In order to tension the belt 52, the tension regulating or adjusting mechanism 53 additionally includes retaining means for retaining the first bearing 24 and the second wheel 50 to be kept in the desired position of adjustment. More specifically, the retaining means allow the first bearing 24 and the second wheel 50 to be immobilized. For this purpose, the retaining means for retaining the first bearing 24 and the second wheel 50 in the desired position of adjustment include a tensioning member 56 which acts on the first bearing 24 following a straight line 57 passing at least approximately through the axis of rotation 49a of the first wheel 49 and the axis of rotation 50a of the second wheel 50. According to the embodiment depicted, the tensioning member 56 includes of a telescopic strut 59 having a first threaded shank 60, a second threaded shank 61, and a tapped tube 62. The tapped tube 62 has first and second ends into which the first and second threaded shanks 60 and 61 are screwed.

The screw thread on the first threaded shank 60 is of the opposite direction to the screw thread of the second threaded shank 61, and this advantageously allows the telescopic strut 59 to be lengthened or shortened by turning the tapped tube 62 in one direction or the other.

For this purpose, in order to tension the belt 52, the first threaded shank 60 is connected, on one hand, to a stationary element which, according to the embodiment depicted, consists of the box 47, via another connection 64 of the pivot type having a longitudinal axis 64a, and the second threaded shank 61 is connected to the connecting rod 25 of the first support 22 via an additional connection 65 of the pivot type having a longitudinal axis 65a.

It will be noted that the two longitudinal axes 64a, 65a are at least approximately mutually parallel and at least approximately parallel to the axis of rotation 17a of the treatment rotor 17.

The two longitudinal axes 64a, 65a are located, when viewed from the side as shown in FIG. 2, at least approximately on the straight line 57 between the axis of rotation 49a of the first wheel 49 and the axis of rotation 50a of the second wheel 50. A configuration of this kind with the two longitudinal axes 64a, 65a allows the telescopic strut 59 to act directly on the connecting rod 25 and therefore, on the second wheel 50, thus making it considerably easier to adjust the tension in the belt 52.

Thus, to regulate or adjust the tension in the belt 52, the operator acts directly on the tapped tube 62 of the telescopic strut 59 by rotating the telescopic strut 59 about the straight line 57 in one direction or the other, which has the effect of lengthening or shortening the telescopic strut 59 and thus allows the second wheel 50 to be moved away from or closer to the first wheel 49, depending on whether the desire is to increase or decrease the tension in the belt 52.

For this purpose, when the second wheel 50 moves away from or closer to the first wheel 49, the first bearing 24 pivots about he longitudinal axis 30a of the articulation 30, which has the effect of pivoting the treatment rotor 17 somewhat about the spherical-type bearing 41 connecting the right-hand lateral end 21 of the treatment rotor 17 to the double connecting rod 39 of the second support 23. It will be noted that the operation of regulating or adjusting the tension in the belt 52 requires no tooling and that the operator can operate the tapped tube 62 directly using his hands.

Various modifications may be made to the example which has just been described, particularly as regards the construction of the various elements or by substituting technical equivalents without in any way departing from the scope of protection defined by the claims.

Thus, for example, it is perfectly possible for the transmission device 48 to include two or more belts for transmitting more power from the first wheel 49 to the second wheel 50.

There may also be a locking device for locking the telescopic strut once the tension in the belt 52 has been adjusted.

What is claimed as new and desired to be secured by Letters Patent of the United States is:

1. A treatment device for treating cut fodder, said treatment device comprising:
   a treatment rotor rotatable about an axis of rotation, said treatment rotor and said axis of rotation both extending, during operation of said treatment device, so as to be approximately transverse to a direction of forward travel and so as to be approximately horizontal;
   a first support located near a first end of said treatment rotor, said first support including a first bearing in which said first end of said treatment rotor is guided during a rotation of said treatment rotor;
   a second support located near a second end of said treatment rotor, said second support including a second bearing in which said second end of said treatment rotor is guided during said rotation of said treatment rotor; and
   a driving device for driving said treatment rotor, said driving device including a drive member and a transmission device, said transmission device including:
      a first wheel mounted on an output shaft of said drive member,
      a second wheel mounted on said first end of said treatment rotor,
      at least one endless transmission member wound around said first wheel and said second wheel, and
      a tension regulating mechanism for regulating a tension in said at least one endless transmission member by movement of said treatment rotor, wherein said tension regulating mechanism includes said first bearing of said first support and said second wheel of said transmission device of said driving device such that both of said first bearing and said second wheel move away from said first wheel to attain a desired position of adjustment; and
   retaining means for retaining said first bearing and said second wheel in said desired position of adjustment.

2. The treatment device as claimed in claim 1, wherein said retaining means retains said first bearing and said second wheel in said desired position of adjustment by immobilizing said first bearing and said second wheel.

3. The treatment device as claimed in claim 1, wherein said first support includes a carrier member to which said first bearing is connected via an articulation, an axis of which is parallel to said axis of rotation of said treatment rotor.

4. The treatment device as claimed in claim 3, wherein said articulation connecting said first bearing to said carrier member is of an elastic type.

5. The treatment device as claimed in claim 1, wherein said retaining means includes a tensioning member which acts on said first bearing.

6. The treatment device as claimed in claim 5, wherein said tensioning member acts following a straight line passing through an axis of rotation of said first wheel and an axis of rotation of said second wheel.

7. The treatment device as claimed in claim 5, wherein said tensioning member is a telescopic strut.

8. The treatment device as claimed in claim 7, wherein said telescopic strut includes two threads of opposite pitch.

9. The treatment device as claimed in claim 1, wherein said second bearing is of a spherical type.

10. The treatment device as claimed in claim 1, wherein said second support includes a carrier member to which said second bearing is connected via an elastic connection.

11. A mower comprising:
   at least one cutting mechanism and at least one treatment device, wherein said at least one treatment device includes:
      a treatment rotor rotatable about an axis of rotation, said treatment rotor and said axis of rotation both extending, during operation of said treatment device, so as to be approximately transverse to a direction of forward travel and so as to be approximately horizontal;
      a first support located near a first end of said treatment rotor and including a first bearing in which said first end of said treatment rotor is guided during a rotation thereof;
      a second support located near a second end of said treatment rotor and including a second bearing in which said second end of said treatment rotor is guided during said rotation thereof; and
      a driving device for driving said treatment rotor, said driving device including a drive member and a transmission device, said transmission device including:
         a first wheel mounted on an output shaft of said drive member;

a second wheel mounted on said first end of said treatment rotor;

at least one endless transmission member wound around said first wheel and said second wheel;

a tension regulating mechanism for regulating a tension in said at least one endless transmission member, wherein said tension regulating mechanism includes said first bearing of said first support and said second wheel of said transmission device of said driving device such that both of said first bearing and said second wheel move away from said first wheel to attain a desired position of adjustment; and retaining means for retaining said first bearing and said second wheel in said desired position of adjustment.

12. A treatment device configured to treat cut fodder, said treatment device comprising:

a treatment rotor rotatable about an axis of rotation, said treatment rotor and said axis of rotation both extending, during operation of said treatment device, so as to be approximately transverse to a direction of forward travel and so as to be approximately horizontal;

a first support located near a first end of said treatment rotor, said first support including a first bearing in which said first end of said treatment rotor is guided during a rotation of said treatment rotor;

a second support located near a second end of said treatment rotor, said second support including a second bearing in which said second end of said treatment rotor is guided during said rotation of said treatment rotor; and a driving device configured to drive said treatment rotor, said driving device including a drive member and a transmission device, said transmission device including:

a first wheel mounted on an output shaft of said drive member, a second wheel mounted on said first end of said treatment rotor, at least one endless transmission member wound around said first wheel and said second wheel, and a tension regulating mechanism configured to regulate a tension in said at least one endless transmission member by movement of said treatment rotor, wherein said tension regulating mechanism includes said first bearing of said first support and said second wheel of said transmission device of said driving device such that both of said first bearing and said second wheel move away from said first wheel to attain a desired position of adjustment; and retaining means configured to retain said first bearing and said second wheel in said desired position of adjustment.

13. The treatment device as claimed in claim 12, wherein said retaining means retains said first bearing and said second wheel in said desired position of adjustment by immobilizing said first bearing and said second wheel.

14. The treatment device as claimed in claim 12, wherein said first support includes a carrier member to which said first bearing is connected via an articulation, an axis of which is parallel to said axis of rotation of said treatment rotor.

15. The treatment device as claimed in claim 14, wherein said articulation connecting said first bearing to said carrier member is of an elastic type.

16. The treatment device as claimed in claim 12, wherein said retaining means include a tensioning member which acts on said first bearing.

17. The treatment device as claimed in claim 16, wherein said tensioning member acts following a straight line passing through an axis of rotation of said first wheel and an axis of rotation of said second wheel.

18. The treatment device as claimed in claim 16, wherein said tensioning member is a telescopic strut.

19. The treatment device as claimed in claim 18, wherein said telescopic strut includes two threads of opposite pitch.

20. The treatment device as claimed in claim 12, wherein said second bearing is of a spherical type.

21. The treatment device as claimed in claim 12, wherein said second support includes a carrier member to which said second bearing is connected via an elastic connection.

22. A mower comprising:

at least one cutting mechanism and at least one treatment device, wherein said at least one treatment device includes:

a treatment rotor rotatable about an axis of rotation, said treatment rotor and said axis of rotation both extending, during operation of said treatment device, so as to be approximately transverse to a direction of forward travel and so as to be approximately horizontal;

a first support located near a first end of said treatment rotor and including a first bearing in which said first end of said treatment rotor is guided during a rotation thereof;

a second support located near a second end of said treatment rotor and including a second bearing in which said second end of said treatment rotor is guided during said rotation thereof, and a driving device configured to drive said treatment rotor, said driving device including a drive member and a transmission device, said transmission device including:

a first wheel mounted on an output shaft of said drive member;

a second wheel mounted on said first end of said treatment rotor;

at least one endless transmission member wound around said first wheel and said second wheel;

a tension regulating mechanism configured to regulate a tension in said at least one endless transmission member, wherein said tension regulating mechanism includes said first bearing of said first support and said second wheel of said transmission device of said driving device such that both of said first bearing and said second wheel move away from said first wheel to attain a desired position of adjustment; and retaining means configured to retain said first bearing and said second wheel in said desired position of adjustment.

* * * * *